Nov. 17, 1936.  T. M. FRASER  2,061,231
FRONT AXLE FOR VEHICLES
Filed March 3, 1936
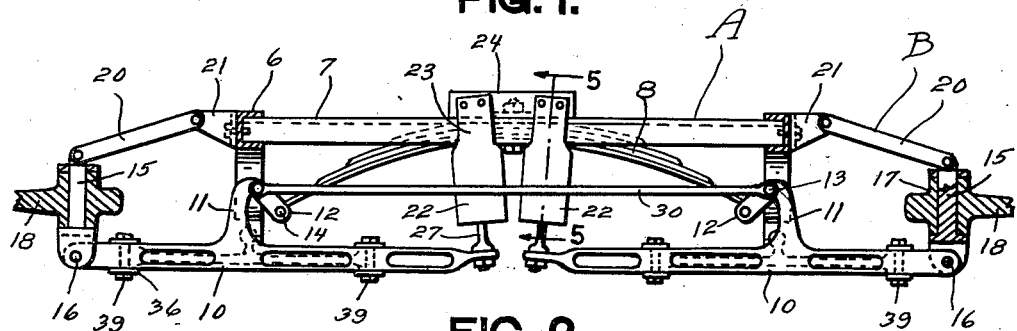
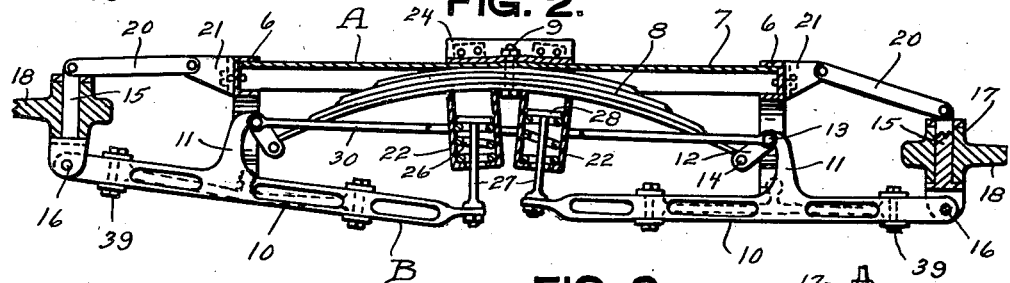
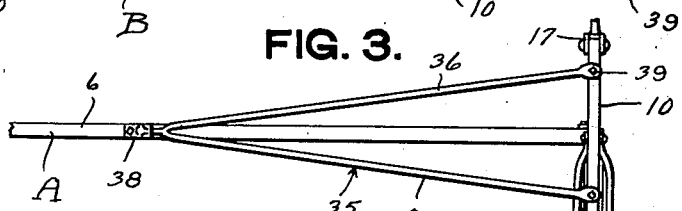
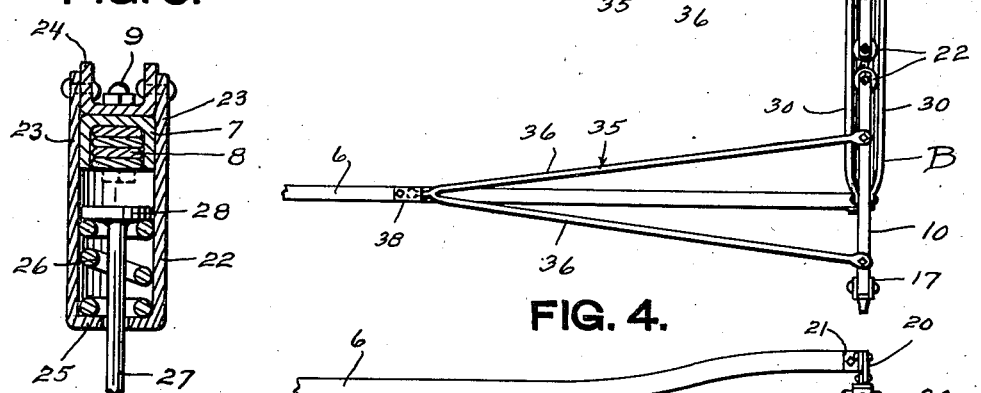
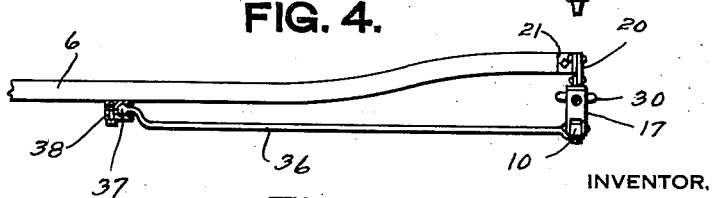
INVENTOR,
Thomas M. Fraser
BY *Lancaster, Allwine and Rommel*
ATTORNEYS.

Patented Nov. 17, 1936

2,061,231

UNITED STATES PATENT OFFICE 2,061,231

FRONT AXLE FOR VEHICLES

Thomas M. Fraser, Sheridan, Wyo.

Application March 3, 1936, Serial No. 66,910

11 Claims. (Cl. 267—19)

The present invention relates to motor vehicles and more particularly to improvements in front spring suspension means for motor vehicles.

The primary object of the invention is to provide an improved front axle and spring construction for motor vehicles wherein road shocks are absorbed by each front wheel independently and without imparting any appreciable upward movement to the vehicle frame.

A further object is to provide a suspension means for the front of motor vehicles, embodying a two piece axle structure having such connection with the vehicle frame as to permit relative yielding of the axle sections without disalignment of the wheels carried by the axle sections.

A further object resides in the arrangement whereby the relatively movable axle sections are held to movement in a vertical direction and restrained against lateral and longitudinal movement.

A further object resides in the novel spring arrangement whereby certain of the springs in addition to acting as suspension springs, also serve as snubbers to check rebounding.

Other objects and advantages of the invention will be apparent from the following detailed description, taken in connection with the accompanying drawing forming a part of this specification and in which drawing:—

Figure 1 is a view in front elevation of the front spring construction.

Figure 2 is a view part in front elevation and part in section and showing one of the axle sections rocked upwardly at its outer end as when the wheel carried thereby meets an obstruction in the road.

Figure 3 is a bottom plan view on a reduced scale.

Figure 4 is a side view of the showing in Figure 3.

Figure 5 is an enlarged fragmentary section on the line 5—5 of Figure 1.

In the drawing and wherein like reference characters designate corresponding parts thruout the several views, the letter A may designate a motor vehicle frame provided at its forward end with the improved axle and spring assembly designated as a whole by the letter B.

The frame A embodies the side frame rails 6 which are joined at their forward end portions by a channel-shaped cross rail 7. This cross rail 7 as seen in Figure 5 is arranged with its channeled side opening downwardly.

Referring now to the structure B, the same comprises a transverse semi-elliptic leaf spring 8 arranged longitudinally beneath the cross rail 7. The central portion of the spring 8 extends into the channel of the cross rail and is secured to the web of the rail by a bolt 9 so that the downwardly extending flanges of the rail serve to retain the spring longitudinally of the rail. Adapted to be associated with each end of the transverse leaf spring 8, is an axle member or section 10 and these axle sections are so yieldably mounted as to be relatively movable with respect to each other and also with respect to the frame.

These axle members 10 are of like construction and each is provided at a point substantially midway of its ends with a spring perch 11 having its upper end directed toward the inner end of the member. The perches 11 are connected by shackles to the ends of the leaf spring 8 whereby the perches are disposed directly beneath the ends of the cross rail 7 in substantial alignment with the side rails 6. The shackles for connecting the spring 8 to the perches 11 each comprises a pair of links 12 pivotally connected at their upper ends to the perch by a bolt 13, and at their lower ends to the spring by a bolt 14. Thus the axle members 10 are disposed longitudinally beneath the spring 8 with the outer end portions of the members extending laterally of the frame A beyond the side rails 6. The inner ends of the axle members are slightly spaced apart as seen in Figures 1 and 2.

The axle members 10 are each adapted to support a wheel (not shown) at their outer ends for steering the vehicle. Mounted upon the outer end of each axle member 10 is an upstanding steering knuckle pin 15, and these pins are pivotally secured at their lower ends to the axle members by horizontal pivot bolts or pins 16 which extend parallel with the frame side rails 6. Each of the pins 15 supports a steering knuckle 17 of any suitable construction having a spindle 18 for mounting of the front ground wheels of the vehicle. Pivotally connected at their outer ends, one to the upper end of each of the steering knuckle pins 15, are brace links 20 which are normally inclined upwardly toward the vehicle frame and have their inner ends pivoted in brackets 21 secured to the side rails 6 at the ends of the cross rail 7. Thus the brace links 20 are mounted for vertical swinging movement at their outer ends upon vertical movement of the steering knuckle pins 15.

The inner ends of the axle members 10 are connected to the cross rail 7 by a yieldable spring suspension means permitting independent yielding of the axle members due to obstructions engaged by the wheels thereof. Mounted midway between the ends of the cross rail 7 is a pair of tubular cylinders 22 having bifurcated upper ends providing attaching arms 23 adapted to straddle the spring 8 and cross rail 7. These arms 23 extend above the cross rail 7 and have their upper ends secured as by riveting, bolting or the like to a channel-shaped member 24 held against longitudinal movement of the spring bolt 9. The cylinders 22 are arranged in slightly upwardly diverging relation and each has its lower end closed to provide a seat 25 for the lower end of a coil spring 26. Preferably rigidly secured to the inner end of each axle member 10 is a piston or suspension rod 27 and these rods extend upwardly into their respective cylinders 22 thru the coil springs 26. Secured to the upper end of each rod 27 is a cap or head 28 and these caps form abutments for the upper ends of the springs 26 whereby the springs are compressed upon downward swinging of the axle members at their inner ends.

Connecting the spring perches 11 is a pair of tie rods 30 having their ends connected with the perches by the upper shackle bolts 13 whereby the perches are held in a definite spaced apart relation at their upper ends. These tie rods 30 are mounted upon the ends of the bolts 13 and extend one at each side of the cylinders 22 whereby the tie rods not only serve to connect the axle members 10, but also causes them to be braced against one another so that the coil springs 26 will be compressed when one or the other axle member yields.

Each axle member 10 is connected with the frame A by a V-shaped radius rod 35 so arranged as to permit the axle members to move up and down or for one end to move up while the other moves down without creating any twisting strain. These radius rods 35 each includes a pair of forwardly diverging rods 36 which may be slightly upwardly offset at the apex and provided with a ball end 37 working in a socket 38 secured beneath the side frame rails 6. These rods 36 are relatively long and have forked forward ends which straddle the axle members 10 at points adjacent the ends thereof and are secured by bolts 39 passed vertically thru the axle members. By having the radius rods 35 relatively long, the rocking arc of movement of the forward ends of the rods will have sufficient radius as to eliminate binding. While there will be no fixed horizontal pivotal axis about which the axle members rock, this axis is at the location of the perches 11, and from Figures 1 and 2 it will be seen that the ball and socket joints of the radius rods align rearwardly of the perches 11.

As to the operation of the structure, Figure 1 illustrates the condition of parts when a normal load is upon the springs with the vehicle wheels upon a flat surface and in which condition the axle members 10 align in a horizontal position. As in Figure 2, when the left wheel engages an object the left axle member is raised at its outer end against the tension of the transverse leaf spring 8 and the inner end of the axle member lowered compressing its coil spring 26. The axle member thus rocks about a slightly shifting pivot axis at the spring perch 11 while the vehicle frame has a tendency to remain in an undisturbed position.

As the axle member is forced upwardly at its outer end, this action will have a tendency to tilt its spring perch inwardly, and which action will be resisted by the tie rods 30. This resistance of the tie rods 30 against inward tilting of the spring perch will also cause the axle member to be crowded outward slightly to partially compensate for slight inward swinging of the steering knuckle pin 15 at its lower end as the pin is moved upwardly. As the pin 15 moves upwardly, the brace link 20 connected with the upper end of the pin will serve to retain the pin in a vertical position so that the ground wheels are retained in proper vertical position.

Changes in detail may be made to the form of invention herein shown and described, without departing from the spirit of the invention or the scope of the following claims.

I claim:

1. A front suspension for motor vehicle bodies, comprising a pair of relatively movable axle sections, spring means suspending the body from the intermediate portions of the axle sections, spring means yieldably suspending the inner ends of the axle sections, a steering knuckle at the outer end of each axle section, tie rods connecting the axle sections, and clamping means between the axle sections and body permitting relative yielding of the axle sections without disalignment of said steering knuckles.

2. In a front suspension for vehicle frames, a pair of axle sections, spring means connecting the axle sections at their intermediate portions to the frame, spring means separately connecting the inner ends of the axle sections to the frame, a steering knuckle pin at the outer end of each axle section, means retaining the axle sections against lateral movement, tie rods connecting the axle sections, and means for retaining said steering knuckle pins in a vertical position.

3. In a front suspension for vehicle frames, a transverse leaf spring, a pair of axle sections, shackles connecting the ends of the spring to the intermediate portions of the axle sections, spring means connecting the inner end of each axle section to the frame, a steering knuckle at the outer end of each axle section, link means connecting each steering knuckle to the frame, and a radius rod connecting each axle section to the frame.

4. In a front suspension for vehicle frames, a semi-elliptic spring mounted transversely of the frame, a pair of axle members each having a perch substantially midway of its ends, shackles connecting the ends of the spring to the perches, tie rods connecting the perches, a steering knuckle at the outer end of each axle member, spring means yieldably suspending the inner ends of the axle members from the frame, means retaining the axle members to movement in a vertical direction, and means for retaining the steering knuckles in proper wheel supporting position.

5. In a front suspension for vehicle frames, a semi-elliptic spring mounted transversely of the frame, a pair of axle members each having a perch intermediate its ends, means connecting the spring at its ends to the perches, tie rods connecting the perches, coil spring means connecting the inner ends of the axle members to the frame and placed under compression upon upward swinging of the axle members at their outer ends, a radius rod connecting each axle member to the frame and permitting rocking movement thereof, a steering knuckle pin at the outer end of each axle member, and a link connection between each pin and the frame for retaining the pins in a vertical position upon rocking movement of the axle members.

6. In a front suspension for vehicle frames, a semi-elliptic spring mounted transversely of the frame, a pair of axle members, means connecting the axle members at their intermediate portions to the ends of the spring, tie rods connecting the axle members and permitting independent rocking movement of the latter, a coil spring supported upon the frame at the inner end of each axle member, a suspension arm extending upwardly from the inner end of each axle member one thru each of the coil springs, a head on the upper end of each arm for engaging the coil springs, and brace means between the axle members and frame and permitting vertical rocking movement of the members.

7. In a front suspension for vehicle frames, a semi-elliptic spring mounted transversely of the frame, a pair of axle members extending longitudinally beneath the spring and having pivotal link connection intermediate their ends with the ends of the spring, a steering knuckle pin at the outer end of each axle member, a pair of cylinders carried by the frame above the inner ends of the axle members, a coil spring in each cylinder, a suspension arm on the inner end of each axle member and extending upwardly thru the springs, a head on each arm for engaging upon the upper ends of the springs, a radius rod connecting each axle member with the frame, and a link connecting each steering knuckle pin with the frame.

8. In a front suspension for vehicle frames including side rails and a front cross rail, a semi-elliptic spring secured longitudinally beneath the cross rail, a pair of axle members each having a perch intermediate its ends, links pivotally connecting the ends of the spring to said perches, tie rods connecting the perches, means yieldably suspending the inner ends of the axle members from the cross rail, a steering knuckle pin at the outer end of each axle member, a V-shaped radius rod connected to each axle member and extending rearwardly therefrom, a ball and socket joint connecting the apex of the radius rods with said side rails, and a link connection between each steering knuckle pin and the frame.

9. In a front suspension for vehicle frames including side rails and a front cross rail, a semi-elliptic spring mounted longitudinally beneath the cross rail, a pair of axle members each having an upstanding perch intermediate its ends substantially aligning with said side rails, spring shackles connecting the ends of the spring with the perches, a V radius rod for each axle member and having swivel connection with said side rails permitting vertical rocking of the axle members, means yieldably suspending the inner ends of the axle members from the cross rail, means for supporting a wheel upon the outer end of each axle member, and means for retaining said last mentioned means in proper position upon rocking of the axle members.

10. In a front suspension for vehicle frames including a front cross rail, a semi-elliptic leaf spring mounted longitudinally beneath the rail, a pair of axle members, means pivotally connecting the ends of the spring to the intermediate portions of the axle members, a pair of cylinders suspended from the central portion of the cross rail and each having an annular shoulder, a coil spring in each cylinder and resting upon said shoulders, a suspension rod on the inner end of each axle member and extending upwardly one thru each of said coil springs, a head on each rod for resting upon the coil springs, tie rods connecting the axle members, and means for preventing lateral movement of the axle members.

11. In a front suspension for vehicle frames, a pair of axle members, a semi-elliptic spring disposed longitudinally with relation to and above the axle members for yieldably suspending the frame from the intermediate portion of each axle member, means yieldably suspending the inner ends of the axle members from the frame, and coupling means between the axle members and frame for retaining the axle members to rocking movement in a vertical direction.

THOMAS M. FRASER.